US007266371B1

(12) United States Patent
Amin et al.

(10) Patent No.: US 7,266,371 B1
(45) Date of Patent: Sep. 4, 2007

(54) ACTIVATION AND REMOTE MODIFICATION OF WIRELESS SERVICES IN A PACKET NETWORK CONTEXT

(75) Inventors: Umesh J. Amin, Redmond, WA (US); Brian Kevin Daly, Issaquah, WA (US); Gary Kessler, Issaquah, WA (US); Greg A. Wong, Mercer Island, WA (US); Hong Zhao, Redmond, WA (US); John Eric Myhre, Shoreline, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 715 days.

(21) Appl. No.: 09/707,671

(22) Filed: Nov. 7, 2000

Related U.S. Application Data

(60) Provisional application No. 60/184,183, filed on Feb. 22, 2000.

(51) Int. Cl.
*H04M 3/00* (2006.01)
*H04M 1/00* (2006.01)
*H04Q 7/20* (2006.01)
*H04B 1/38* (2006.01)

(52) U.S. Cl. .................. 455/419; 455/418; 455/420; 455/517; 455/550.1; 455/551; 455/556.2; 455/558

(58) Field of Classification Search ........ 455/418–420, 455/517, 456.1–456.3, 414.1, 414.2, 423–425, 455/435.1, 456.5, 456.6, 550.1, 466, 577–558, 455/551, 552.1, 556.2, 560–561, 565–566; 370/395.52, 395.53, 912–913; 379/88.15, 379/207.02, 207.11, 207.12, 207.13
See application file for complete search history.

(56) References Cited

U.S. PATENT DOCUMENTS

| 5,483,672 A | 1/1996 | Sasuta .................... 455/509 |
| 5,485,505 A | 1/1996 | Norman et al. ........ 379/114.19 |
| 5,548,586 A | 8/1996 | Kito et al. ............... 370/349 |
| 5,603,084 A | 2/1997 | Henry, Jr. et al. ......... 455/419 |
| 5,625,885 A | 4/1997 | Nakazawa et al. ......... 340/7.22 |
| 5,854,982 A | 12/1998 | Chambers et al. ......... 455/445 |
| 5,878,339 A | 3/1999 | Zicker et al. ............. 455/419 |
| 5,887,249 A | 3/1999 | Schmid .................... 455/411 |

(Continued)

OTHER PUBLICATIONS

Vedder, "The Subscriber Identity Module," 8 pages [downloaded from the World Wide Web on Sep. 12, 2001].

(Continued)

*Primary Examiner*—Meless Zewdu
(74) *Attorney, Agent, or Firm*—Zagorin O'Brien Graham LLP

(57) ABSTRACT

A third generation (3G) mobile communication system supports an over-the-air activation scheme utilizing a wireless packet data protocol. A subscriber identity module (SIM) is preloaded with temporary operating parameters such as a temporary international mobile subscriber identity (IMSI) that is used for initial access to a network. Once a packet data protocol communication link is established between the mobile device and a network support node, the user may remotely subscribe to a number of service terms using the mobile device. In addition, an activation procedure is carried out to assign permanent operating parameters, e.g., a permanent IMSI, to the SIM. After activation, the user can remotely modify existing terms or remotely enroll in additional service features via a wireless IP link between the mobile device and a network support node.

36 Claims, 8 Drawing Sheets

U.S. PATENT DOCUMENTS

| | | | |
|---|---|---|---|
| 5,887,253 A | 3/1999 | O'Neil et al. | 455/418 |
| 5,918,175 A | 6/1999 | Tayloe et al. | 455/427 |
| 5,920,814 A | 7/1999 | Sawyer et al. | 455/436 |
| 5,937,352 A | 8/1999 | Courtney et al. | 455/435.1 |
| 5,954,817 A | 9/1999 | Janssen et al. | 713/200 |
| 5,956,636 A | 9/1999 | Lipsit | 455/411 |
| 5,970,059 A | 10/1999 | Ahopelto et al. | 370/338 |
| 6,003,112 A | 12/1999 | Tetrick | 711/100 |
| 6,014,561 A | 1/2000 | Mölne | 455/419 |
| 6,016,428 A | 1/2000 | Diachina et al. | 455/435.1 |
| 6,018,656 A | 1/2000 | Shirai | 455/418 |
| 6,035,189 A | 3/2000 | Ali-Vehmas et al. | 455/414.1 |
| 6,073,015 A | 6/2000 | Berggren et al. | 455/432.2 |
| 6,073,016 A | 6/2000 | Hulthen et al. | 455/435.2 |
| 6,097,963 A | 8/2000 | Boltz et al. | 455/518 |
| 6,266,523 B1 | 7/2001 | Cook et al. | 455/403 |
| 6,393,298 B1 | 5/2002 | Fulton | 455/551 |
| 6,529,727 B1* | 3/2003 | Findikli et al. | 455/411 |
| 6,591,098 B1 | 7/2003 | Shieh et al. | 455/419 |
| 6,647,260 B2* | 11/2003 | Dusse et al. | 455/419 |
| 2003/0039237 A1* | 2/2003 | Forslow | 370/352 |
| 2003/0083068 A1 | 5/2003 | Wong | |

OTHER PUBLICATIONS

International Telecommunications Union, ITU-T Recommendation E.212, "The International Identification Plan for Mobile Terminals and Mobile Users," 11 pages (Nov. 1998).

Heine, GSM Networks: Protocols, Terminology, and Implementation, Artech House, pp. iii-xi, 1-18, 31-38, 125-170, 185-273, and 407-416 (1999).

"GSM Architectures and Interfaces," 20 pages (1998).

"The SS7 Signaling Connection Control Part Relay System," 12 pages [downloaded from the World Wide Web on May 16, 2002].

"Introduction to GSM," 6 pages [downloaded from the World Wide Web on May 14, 2002].

"Centrex, Feature Library," 1 page [downloaded from the World Wide Web on May 15, 2002].

"GSM-Global System for Mobile Communication," 3 pages [downloaded from the World Wide Web on May 15, 2002].

Scourias, "A Brief Overview of GSM," 11 pages [downloaded from the World Wide Web on May 16, 2002].

"Understanding Telecommunications," 21 pages [downloaded from the World Wide Web on May 16, 2002].

Christensen, "Mobile Networking," 6 pages (2000).

* cited by examiner

200

202

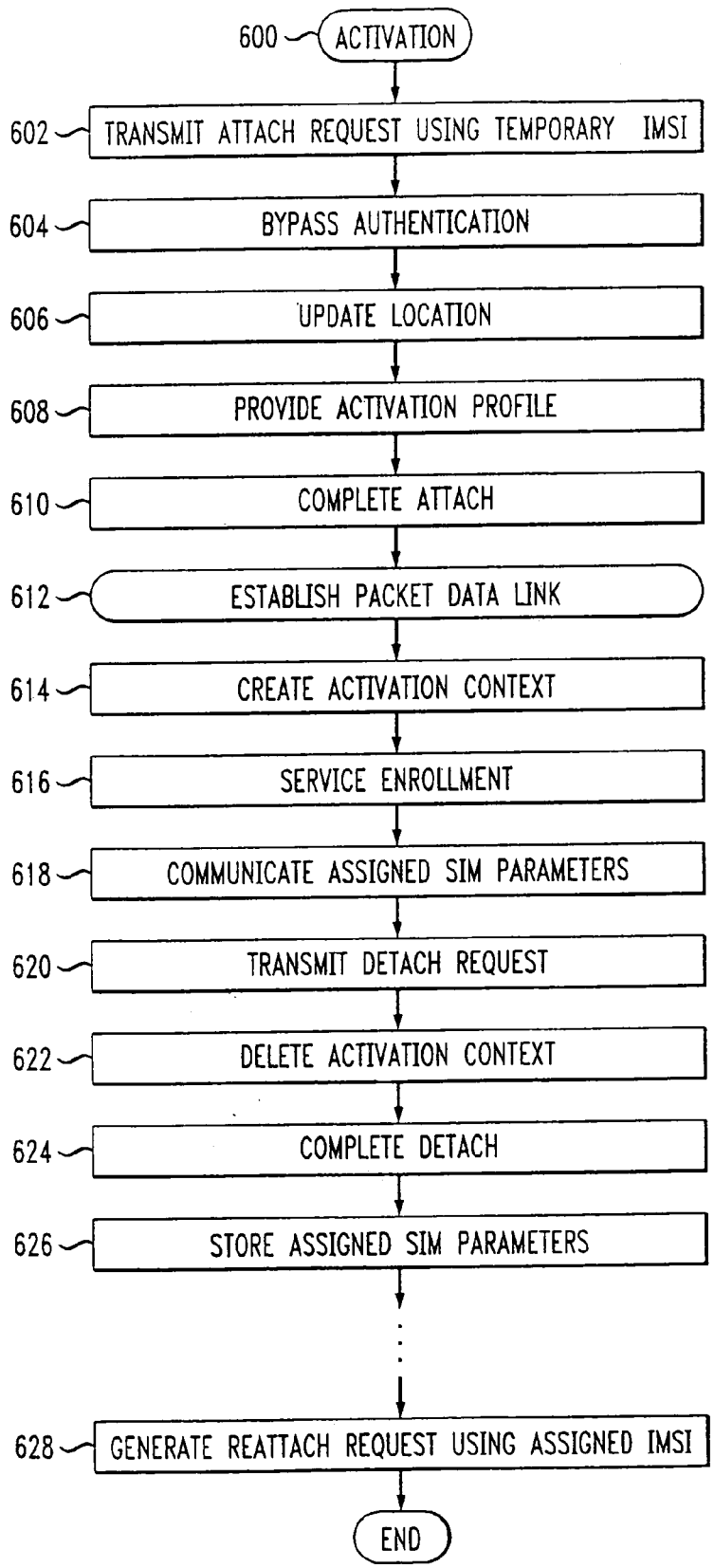

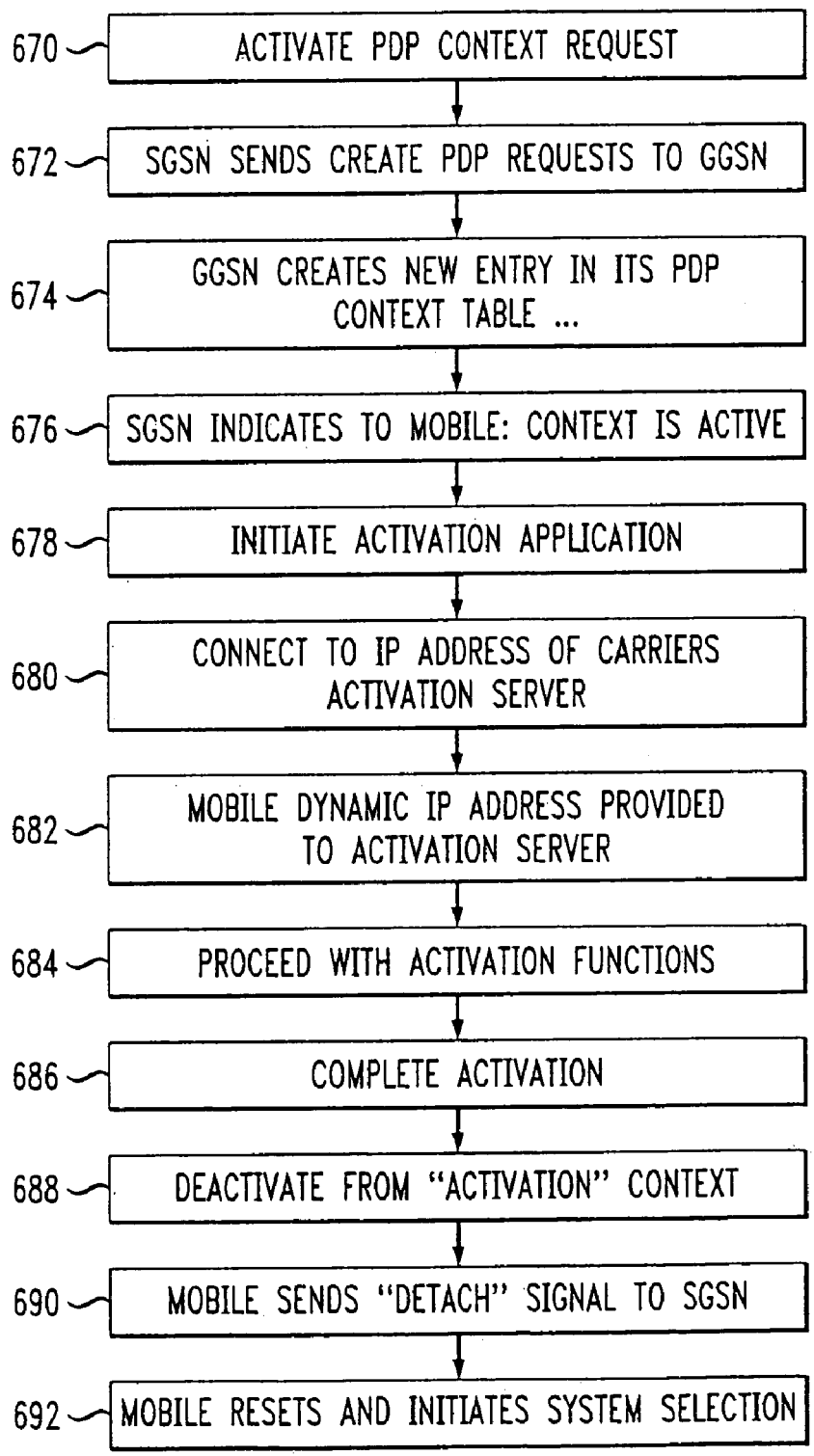

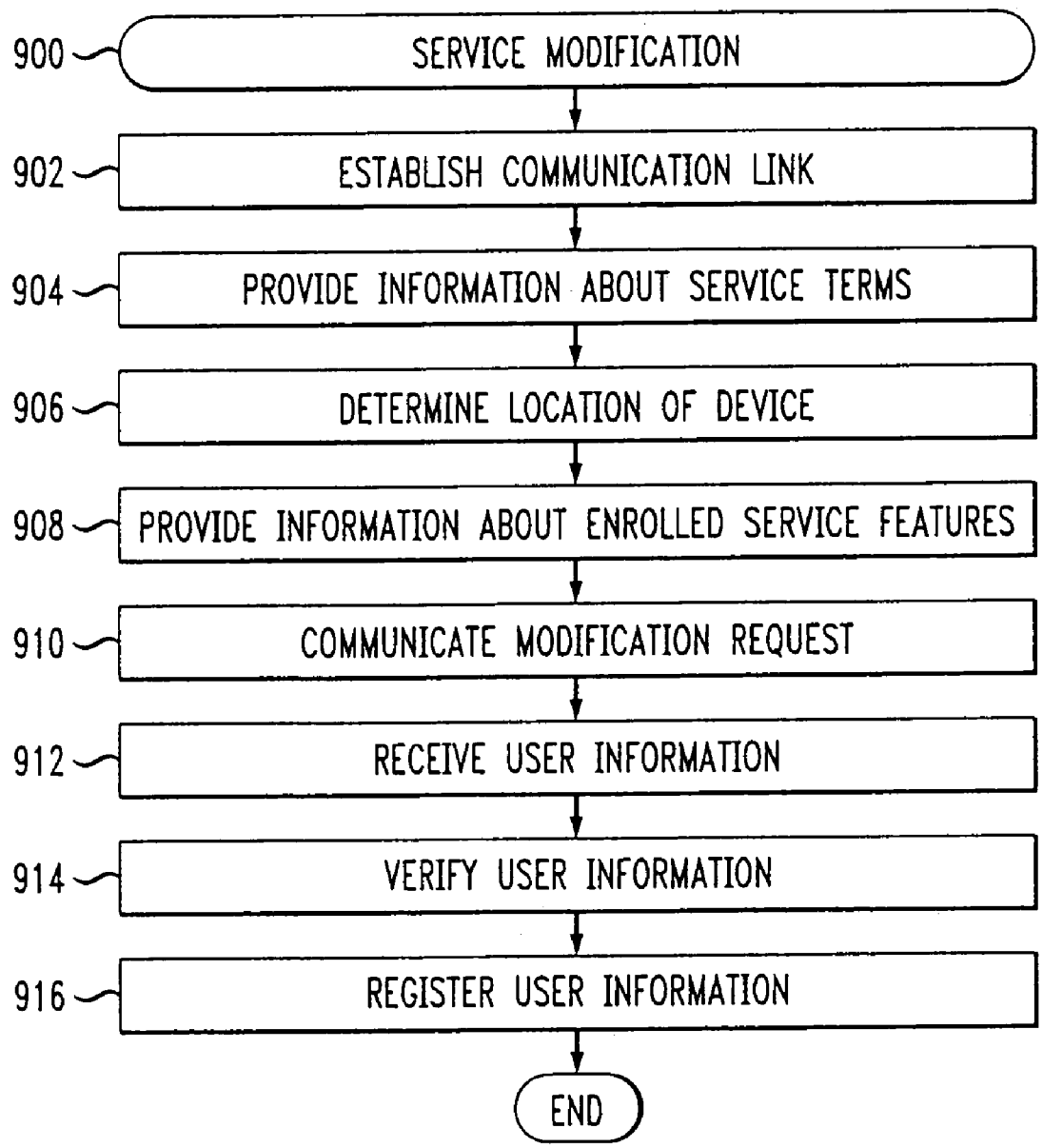

ACTIVATION AND REMOTE MODIFICATION OF WIRELESS SERVICES IN A PACKET NETWORK CONTEXT

RELATED APPLICATION

This application claims the benefit of U.S. Provisional Application No. 60/184,183, filed Feb. 22, 2000 and entitled "ACTIVATION CONCEPT FOR 3G SUBSCRIPTIONS VIA PDP CONTEXT TO ELECTRONIC CARE," which is incorporated herein in its entirety.

FIELD OF THE INVENTION

The present invention relates generally to wireless communication systems. More particularly, the present invention relates to remote activation and feature selection techniques associated with a wireless communication system.

BACKGROUND OF THE INVENTION

FIG. 1a illustrates a second generation (2G) telecommunications environment 100, including a mobile or wireless device 102, a number of base stations 104 and 106, a home location register (HLR) 108, a mobile switching center (MSC) 110, a voice mail server (VMS) 112, a billing system 114, a provisioning system, e.g., a provisioning manager (PM) 116, a database 118, a point of sale (POS) office 120, and a public switched telephone network (PSTN) 122. A 2G network facilitates digital voice and data communication that enable features such as message waiting indication and short message services.

Mobile device 102, base stations 104 and 106, HLR 108, and MSC 110 provide cellular communication services to users. The cellular concept is well known and is generally described in a number of readily available books and articles. Generally, FIG. 1a depicts provisioning interfaces between nodes within the service environment. Accordingly, PM 116, which is the provisioning system maintained by a service provider, is adapted to interconnect various telecommunications service points, such as HLR 108, and VMS 112. PM 116 also provides usage information to billing system 114.

Typically, a user wishing to enroll in a telecommunications service, such as cellular service with a voice mailbox, contacts a POS office 120, either by visiting in person, by writing a letter, or by telephone. The service provider personnel enter the appropriate information into a database 118 to make available the services to the user.

As subscribers use the telecommunication services, PM 116 forwards usage information to the billing system 114, which prepares bills and sends them to the user. In view of the proliferation of telecommunications services and billing plans, the user has very little control over his or her service and billing customization over time. It is desirable that users have more control over the services and billing plans for which they are registered, preferably in a manner which does not impose an enormous burden on telecommunications service provider personnel.

As wireless communication use increases, users are demanding more services through their wireless phones or devices. New features becoming available include, for example, intelligent roaming, Internet browsing, and broadcast short message services. To respond to these demands, currently proposed third generation (3G) networks facilitate data communication using digital packet transmission techniques. The 3G systems will be a total communications solution combining cellular, fixed, and satellite services to fill any communication need. The 3G revolution enables a much broader use of "non-voice" or data communication for these additional services. For backward compatibility with legacy systems, 3G networks may employ conventional digital techniques. A 3G telecommunications environment (not shown in FIG. 1a) may include a number of "nodes" or other functional elements that are substantially equivalent to the functional components shown in FIG. 1a.

Existing wireless systems are increasing their capabilities to provide 3G services or similar services to those offered in the 3G standard. Approval of additional spectrum by the International Telecommunication Union is further enabling the expansion of 3G opportunities. Two wireless systems that will incorporate 3G features are TIA/EIA-136 (TDMA) and Global System for Mobile Communications (GSM), which is widely used in Europe and Asia. GSM offers voice and data services to users on a world-wide basis. Both the TDMA and GSM systems are evolving to accommodate high-speed data capabilities and 3G features. New and efficient data delivery technologies that are making 3G features possible include the High-Speed Circuit Switched Data (HSCSD) and the General Packet Radio Service (GPRS). The GPRS is a value-added service that allows information to be sent and received across the mobile telephone network. The GPRS supplements the Circuit Switched Data (speeds of 9.6 kbps) and Short Message Service (160 characters) to provide a theoretical maximum speed of 384 kbps. In practice, the GPRS will offer up to 115 kbps and mobile Internet access. The GPRS achieves this result by using all eight of the time-slots at the same time. This added bandwidth will facilitate new applications not previously available over the network.

GPRS involves overlaying a packet-based air interface on the existing circuit-switched GSM network. This gives the user an option to use the packet-based data service, which can provide greater bandwidth than using the teleservice delivery mechanism. In order to enable the GPRS capability, network operators need to add several new infrastructure nodes and make software upgrades to the existing network elements. These nodes include the Gateway GPRS Service Node (GGSN) and the Serving GPRS Service Node (SGSN). The GGSN acts as a gateway between the GPRS network and the Public Data Networks such as Internet Protocol (IP) or X.25. GGSNs also connect to other GPRS networks to facilitate GPRS roaming. The Serving GPRS Support Node (SGSN) provides packet routing to and from the SGSN service area for all the users in that service area. Other technical changes to the GSM or TDMA network include the addition of Packet Control Units, mobility management to locate the GPRS mobile station, a new air interface for packet traffic, and securities features.

HSCSD will concatenate or combine any number of the eight timeslots to offer data speeds up to ISDN rates (64 kbps). HSCSD will be implemented in the network mainly through software to allow operators to offer premium high-speed data services with very little investment.

An advantage of the GSM system for security and upgrading features is the use of its subscriber identity module (SIM). The SIM is a removable thumbnail or credit card-sized module that stores specific subscription, identification data, security management and personal telephone books for the respective user. The SIM allows the user to change handsets to get a GSM phone with the latest design or one with additional features while retaining all the personal information. For 3G services in both TDMA and GSM, the SIM cards are invaluable because special protocols and tool kits offer possibilities to download and run applications and/or features on the handset or card with embedded personal data for management and security. In addition, operators and service providers can easily and cost-effectively upgrade feature-sets or capabilities by issuing new cards to users without affecting handsets.

Activation of a typical service account requires the participation of service personnel (similar to activation for a 2G network account). In a conventional GSM environment, a customer purchases a SIM that has already been assigned an international mobile subscriber identity (IMSI), which, in the context of current standards, is a 15 digit number that uniquely identifies the customer. At the time the SIM is purchased, the user must select the wireless services (e.g., the wireless calling features, rate plans, coverage areas, voice mail capabilities, messaging capabilities, or the like) so that the wireless service provider can activate the selected service features for the given IMSI (and, consequently, the SIM).

FIG. 1b illustrates the general system involving a service provider customer service center (CSC) involvement in the activation process for a system using the TIA/EIA-41 standards for inter-node communication. The over-the-air activation process is enabled by teleservices. Teleservices are applications that use the air interface and network interface as bearers for transportation between teleservice servers and mobiles to provide end-to-end service to users. One teleservice is over-the-air activation teleservice (OATS). This service provides over-the-air activation and enables the mobile user to call the service provider without needing to be in the same location to activate the service.

The network architecture for providing OATS messages is shown in FIG. 1b. The mobile station 102 communicates with the base station 104 via a standard protocol such as TIA/EIA 136, for example. The mobile switching center/visitor location register (MSC/NVLR) 110 will communicate OATS messages from the teleservices server 152, via a network interface such as the TIA/EIA-41 network interface using the Short Message Delivery Point-to-Point (SMDPP) protocol. The MSC 110 translates the teleservice information from the SMDPP to the Relay Data (R-DATA) message format and transmits the message over the air interface to the mobile device 102. The teleservice server 152 must also communicate with the home location register (HLR) 156 to obtain routing information for teleservices. In addition to these elements, the customer service center (CSC) 158 launches the activation process and enters the subscriber information into the HLR and billing system 114.

An over-the-air-activation function (OTAF) 154 is a functional part of the teleservice that handles OATS messages and serves as a temporary HLR for an unactivated mobile. Throughout the activation process shown in FIG. 1b, the customer service center representative must be physically involved to obtain and input information. Initially, the user is only able to make a call to the CSC 158 before service is generally activated. At this point, the programming or activation process is initiated. A reauthentication procedure insures that the mobile has stored appropriate authentication-related variables that are used to generate the voice privacy mask and signaling message encryption key. With successful reauthentication, the voice privacy and signaling message encryption are activated and the conversation between the user and the CSC 158 is secure. At this point, billing information may be provided to the service provider's representative.

There are many deficiencies in the approach to wireless device activation. Assigning IMSIs to SIMs prior to the activation of services can place an unnecessary burden on IMSI resources. This burden is caused by unused or obsolete SIMs being discarded before activation, resulting in a waste of assigned IMSIs. Furthermore, activation schemes that require assistance from service technicians are susceptible to human error and inefficiencies, and such activation schemes can be very inconvenient for customers.

BRIEF SUMMARY OF THE INVENTION

What is needed in the art is a mobile device activation procedure that does not require human interaction either in person or over the mobile device to activate the desired services. Furthermore, what is needed is quick and efficient activation procedure for mobile devices in a wireless network that does not result in wasted or unassigned IMSIs.

Accordingly, one benefit of the present invention is to enable activation of mobile device services in a wireless network without the need of human intervention. In addition, the present invention can reduce any unnecessary or wasteful assignments of IMSIs.

It is yet a further advantage of the present invention to provide a convenient and quick mobile device activation service within a 3G and/or GPRS context.

The techniques of the present invention enable activation of the subscription of services in a 3G network environment. In a preferred embodiment, the activation is performed using packet-based over-the-air data transmission techniques. The activation process, whether wireless or otherwise, need not rely on the assistance of service personnel. In addition, IMSIs need not be pre-assigned to SIMs prior to activation. The method of the present invention comprises assigning a temporary IMSI to a SIM, establishing a communication link between an un-programmed mobile station, initiating packet attachment procedures with a serving GPRS support node, and establishing a packet data protocol (PDP) context in a gateway GPRS support node. Establishing a PDP context enables the mobile station to have a dynamically assigned "IP address" and a point-of presence for the mobile station in the IP domain. Thereafter, the method comprises providing service/programming options to the user from an activation server. The user can then choose the appropriate options for the wireless service, and necessary parameters are downloaded to the mobile station including a permanent ID to replace the temporary IMSI. The application connection is then terminated and the mobile station deactivates from the system and the dynamic IP address is released. Once detached, the mobile station resets, committing the downloaded information to memory, and registers with the preferred wireless system with a permanent ID.

According to a further aspect of the present invention, existing service features are remotely modified by a customer without the intervention of service provider personnel. The feature modification aspect of the present invention can be employed in the context of 2G, 3G, or other telecommunication networks. In this manner, customers can immediately modify their service plans in response to current changes in the availability of service features, changes in rate schedules, service provider promotions, or the like.

In another embodiment of the present invention, automated activation of a wireless device can occur in a wireless network. In this embodiment, information regarding available services is provided to the user of the wireless device. This may be through the wireless device itself or some other means such as the Internet. The user then chooses from this menu the desired services to be provided for the wireless device. These service choices are transmitted to the service provider who can verify the user's information and register the user service preferences in a database and begin to provide the chosen services. If the service menu is provided to the wireless device, this is preferably done following the successful establishment of a secure communication channel between the wireless device and the wireless network.

Another embodiment of the invention comprises a method for over-the-air modification of service features for a user of a mobile communication device capable of receiving data using a packet data protocol. This method involves establishing a wireless packet data transmission link associated with the mobile communication device. In this embodiment, an option menu or the like is provided to the user either through the wireless device or through other communication means. The user receives information regarding the present service options and available modifications to the service agreement. The modifications can be for service features, plans, contractual terms, or the like. Once the user has chosen modifications to the set of services associated with the wireless device, the method comprises transmitting, via the wireless packet data transmission link and according to the packet data protocol, a request to modify at least one service feature for the user.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

FIG. 6a is a flowchart illustrating an activation process;

FIG. 6c illustrates a Packet Data Protocol context activation process;

FIG. 9 is a flowchart illustrating a service modification process.

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, certain features of the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission, cellular communication, signaling, security, and other protocols and that the wireless systems described herein are merely exemplary applications for the invention.

It should be appreciated that the particular implementations shown and described herein are illustrative of the invention and its best mode and are not intended to otherwise limit the scope of the invention in any way. Indeed, for the sake of brevity, conventional techniques for signal processing, data transmission, switching, network control, and other functional aspects of the systems (and components of the individual operating components of the systems) may not be described in detail herein. Furthermore, the connecting lines shown in the various figures contained herein are intended to represent exemplary functional relationships, communication paths, and/or physical couplings between the various elements. It should be noted that many alternative or additional functional relationships, communication paths, or physical connections may be present in a practical embodiment.

Figure 1A:
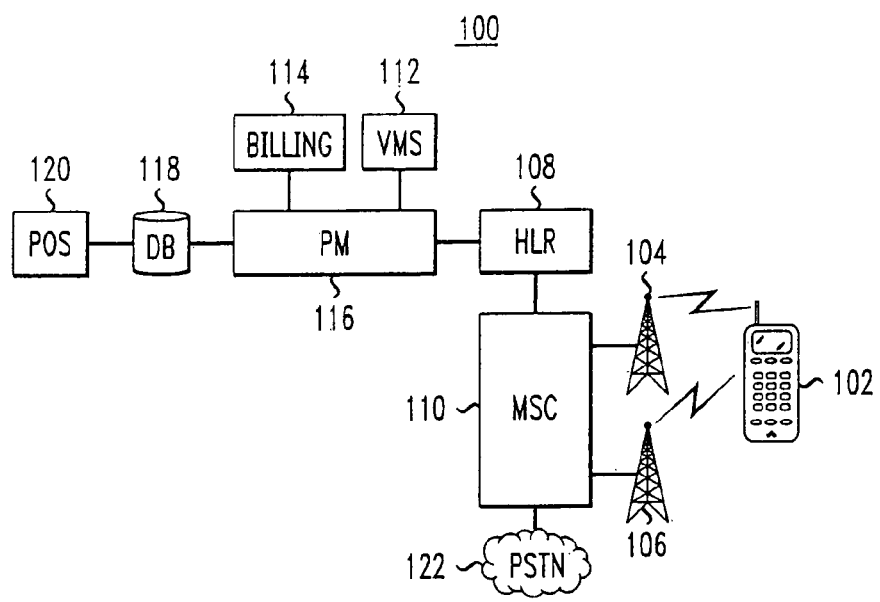
FIG. 1a is a block diagram of a prior art telecommunications environment.
Figure 1B:
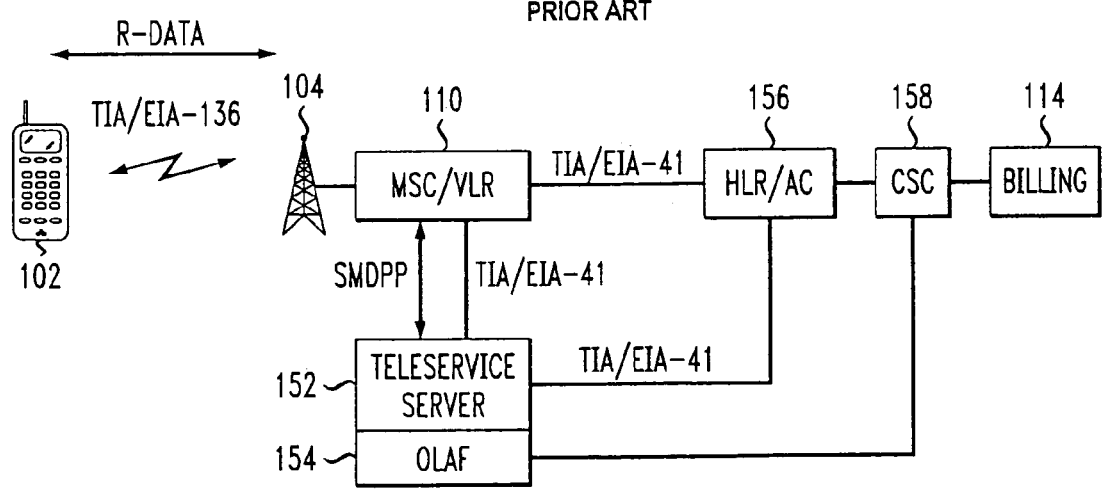
FIG. 1b is a block diagram of network elements and a customer resource center utilized for activation of a wireless device.
Figure 2:
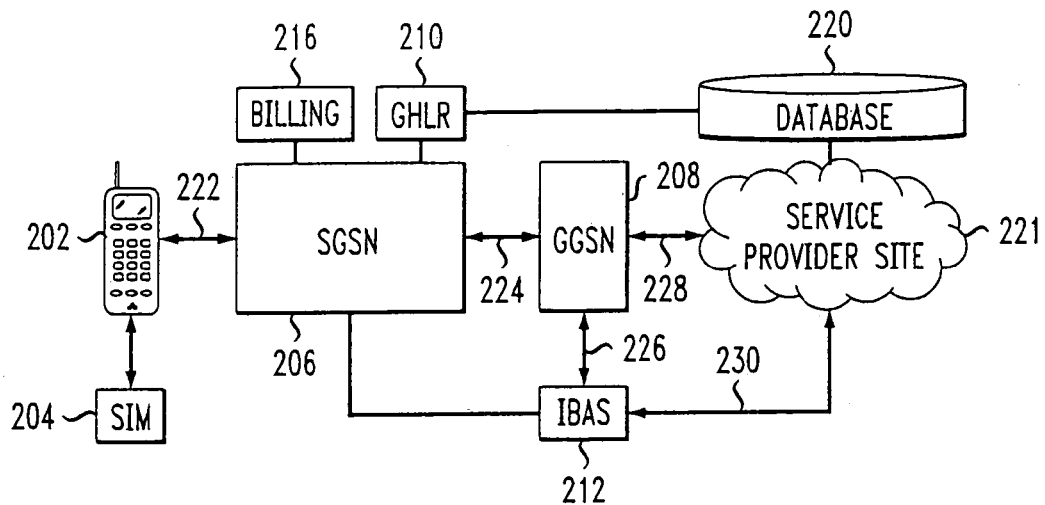
FIG. 2 is a block diagram of a 3G communications environment in which the techniques of the present invention may be employed.

Referring now to FIG. 2, a mobile communication environment 200 is suitably configured for operation according to 3G principles. Environment 200 can be configured in a manner that also supports legacy cellular communications. Thus, although mobile communication environment 200 will be described in the context of a 3G network, the present invention need not be limited to such an operating environment and the operation of legacy cellular system components (which can be combined with aspects of environment 200) will not be described in detail herein. Furthermore, a number of the inventive systems, devices, and techniques described herein may be equivalently applied in the context of a first generation network, a 2G network, a hybrid network, or other telecommunication networks.

A 3G communication network uses General Packet Radio Services (GPRS) to facilitate the transmission of data packets throughout the network. Although any suitable packet-based transmission protocol (whether known or developed in the future) may be utilized by environment 200, the currently preferred embodiment uses the Internet protocol (IP) to communicate data between 3G nodes. Other packet technologies such as Asynchronous Transfer Mode (ATM) or TIA/EIA-41, for example, may be used.

In order to use a GPRS system, the mobile device needs to support GPRS in that legacy mobile devices do not support GPRS packet communication. The currently preferred embodiment deploys GPRS mobile devices in environment 200. Such mobile devices may be configured to operate in multiple modes for compatibility with legacy mobile communication networks. 3G systems and proposed operating standards are described in a number of technical articles and trade publications known to those skilled in the art. Accordingly, the basics of 3G systems will not be described in detail herein.

Mobile communication environment 200 comprises a mobile communication device 202, using a SIM 204, a serving GPRS support node (SGSN) 206, a gateway GPRS support node (GGSN) 208, a GPRS-based home location register (GHLR) 210, and an IP-based activation system (IBAS) 212. SGSN 206 may communicate with a billing system 216, a GHLR 210, a service provider database 220, a service provider Internet site 221, and any number of additional nodes (not shown in FIG. 2) associated with the provision of service features, and/or the operation of environment 200. A practical environment may include any number of SGSNs, GGSNs, GHLRs, IBASs, and other cooperating nodes configured to support a plurality of different mobile devices.

For the sake of clarity, FIG. 2 shows nodes associated with a packet network. Thus, a PSTN and a voice mail server are not depicted. Nonetheless, such elements may be present in a practical environment. For example, a PSTN may interface with GGSN 208 in a suitable manner to support "voice over IP" technology. In a preferred embodiment, mobile device 202, SGSN 206, GGSN 208, and IBAS 212 are each capable of receiving and transmitting information via a suitable packet data transmission link, e.g., an IP link using Wireless Application Protocol (WAP), Transmission Control Protocol (TCP), or User Datagram Protocol (UDP). Such information is communicated in accordance with at least one data transmission protocol, such as the packet data protocol (PDP). In this respect, FIG. 2 depicts a first IP link 222 between mobile device 202 and SGSN 206, a second IP link 224 between SGSN 206 and GGSN 208, a third IP link 226 between GGSN 208 and IBAS 212, a fourth IP link 228 between GGSN 208 and service provider site 221 and a fifth IP link 230 between IBAS 212 and service provider site 221. In a practical embodiment, IP link 222 may be a wireless link that enables mobile device 202 to communicate with SGSN 206 in a manner akin to a conventional cellular device. Mobile device 202 may also be configured to establish IP link 222 over a suitable land-line connection. Although IP links 224, 226, 228, and 230 are preferably established over a land-line connection, mobile communication environment 200 can be flexibly configured to allow wireless IP links between any number of operating nodes.

SGSN 206 is maintained by a service provider or a system operator. Accordingly, SGSN 206 may be part of the business infrastructure rather than the network infrastructure. In a currently preferred embodiment, SGSN 206 performs data switching and routing such that mobile device 202 can communicate with land-line devices, legacy cellular devices, 3G mobile devices, IP-based network support nodes, and/or any device connected to the Internet. SGSN 206 is somewhat analogous to a mobile switching center in a 2G system. Although not shown in FIG. 2, a suitably configured base station may be the initial point of IP contact for mobile device 202; data may then be routed to SGSN 206 and other network support nodes in the system. In a practical system, the base stations may be compatible with GPRS and legacy communication techniques. SGSN 1206 (and other network nodes) may be configured to perform IP switching, IP routing, IP addressing, and other functions in accordance with various known protocols and techniques.

Billing system 216 interacts with SGSN 206 to monitor subscriber use, apply rate plans, generate billing statements, and to perform other functions known to those skilled in the art. Billing system 216 may also be configured to perform credit checking functions to allow service providers to verify the credentials of potential subscribers.

Database 220 may contain information related to service features, subscription plans, rate plans, subscriber identification, IP addresses, subscriber preferences, quality of service parameters, and the like. In a practical implementation, each system operator maintains its own database 220, and each database 220 may be realized with any number of physical components and in any number of geographic locations. Database 220 may be loaded with information for a particular subscriber in response to a conventional point-of-sale activation or sign-up session, in response to a remote activation session (described below), or in response to a remote feature modification session (described below).

GHLR 210 functions as an HLR for purposes of the GPRS or 3G devices operating within mobile communication environment 200. In other words, the locations of a number of devices are monitored by GHLR 210 such that SGSN 206 can direct calls in a proper manner. In one practical embodiment, GHLR 210 may be further configured to provide an activation profile to SGSN 206 during the activation process described below.

IBAS 212 may include or be associated with various memory, processing, and packet-based components. IBAS 212 is preferably realized as a network compatible node, server, software application, or other entity that is capable of programming SIMs via the IP link. In a practical embodiment, IBAS 212 is maintained and implemented by the SIM manufacturer and the SIM manufacturer's application performs the actual programming routine (as described below). In a preferred embodiment, IBAS 212 is further configured to provide an activation profile to SGSN 206 during an activation process.

Service provider site 221 is preferably designed to facilitate communications between various elements and components in the environment 200. For example, as described in more detail below, site 221 preferably allows a user to modify his or her service features via mobile device 202. In addition, site 221 may be involved in the programming of SIM 204.

Figure 3:
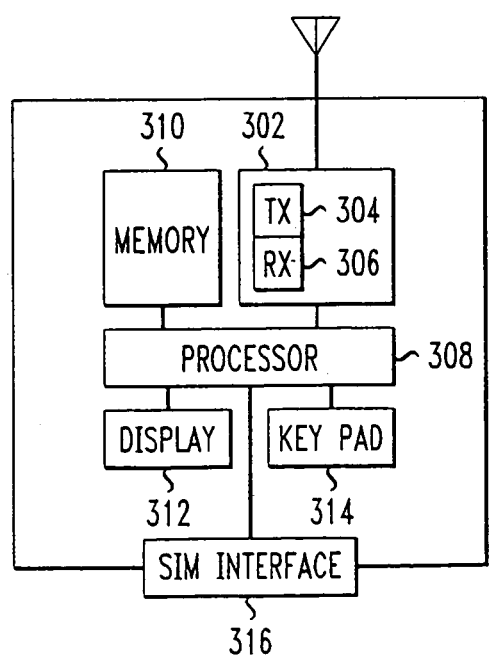
FIG. 3 is a schematic representation of a mobile device configured to carry out the techniques of the present invention.

FIG. 3 is a schematic representation of mobile device 202. In the preferred practical embodiment, mobile device 202 is compatible with GPRS systems. Mobile device 202 may generally include a transceiver 302 having a transmitter section 304 and a receiver section 306, a processor 308, a memory element 310, a display element 312, a keypad 314, and a SIM interface 316. Mobile device 202 may also include any number of additional interfaces (not shown) for supporting various features such as headphones, modems, battery chargers, and the like. Transceiver 302 is suitably configured to support IP communication and to establish a packet data communication link with SGSN 206. Transceiver 302 (or any number of additional transceivers included with mobile device 202) may be further configured to support legacy wireless communication schemes such as 2G. SIM interface 316 is configured physically and electronically to mate with SIM 204.

Figure 4:
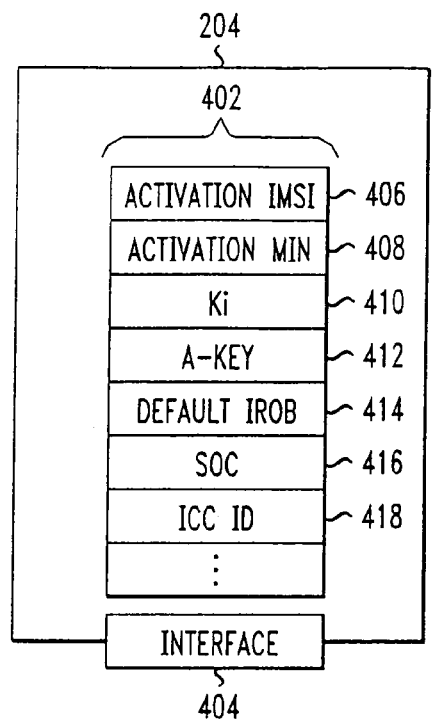
FIG. 4 is a schematic representation of a pre-loaded SIM having a number of temporary operating parameters stored therein.

An exemplary initial configuration for SIM 204 is shown in FIG. 4. In general terms, SIM 204 includes a memory element 402 associated with mobile device 202 and an interface 404 configured for compatibility with SIM interface 316 (see FIG. 3). In the preferred embodiment, SIM 204 is a programmable module and memory element 402 is capable of storing at least one temporary operating parameter that facilitates operation of mobile device 202 in an activation mode. For purposes of this description, an "activation mode" means an initial communication session during which mobile device 202 is activated for continued operation within mobile communication environment 200. Mobile device 202 may be capable of placing emergency calls or calls to a restricted number of destinations while in the activation mode. As described in more detail below, interface 404 is configured to receive at least one assigned operating parameter during the activation mode.

In an alternate embodiment of the present invention, SIM 204 may be an integral part of mobile device 202. In other words, memory element 402 may be realized in memory element 310 of mobile device 202.

In a practical embodiment, a given system operator or service provider can designate any number of operating parameters for pre-loading into SIM 204. Some of the pre-loaded parameters may be permanent in nature (as in conventional SIMs) and at least one of the preloaded parameters is an initial or temporary operating parameter. The pre-loaded parameters are stored in appropriate fields in memory element 402 (memory element 402 may utilize ROM elements, PROM elements, EPROM elements, or the like) prior to the first use of SIM 204 in mobile device 202. In a typical application, the system operator will provide the initial loading data to a SIM manufacturer, and the pre-loaded SIMs will be produced for customer distribution by the system operator or by any merchant authorized to do so on behalf of the system operator. In addition, the system operator may provide the initial loading data to IBAS 212 to facilitate remote activation using legacy protocols such as 2G. In this case, for example, the initial loading data would enable IBAS 212 to identify SIM 204 in the absence of an IP link and to facilitate communication via the short message service. Eventually, the pre-loaded SIMs are provided to customers in a state that is ready for remote activation by the user.

FIG. 4 depicts a number of pre-loaded operating parameters that may be employed in a practical SIM 204. An activation or temporary IMSI 406 is a temporary operating parameter that allows mobile device 202 to gain access to the 3G network or with a packet radio network, during the activation mode. The IMSI 406 defines a Mobile Country Code (MCC) and Mobile Network Code (MNC) for the carrier which will service the mobile station. In the preferred embodiment, the activation IMSI 406 is called the Activation Mobile Station Identifier (ActMSID). Similarly, in the so-called Digital PCS system, an activation Mobile Identification Number (MIN) 408, similar to the IMSI, is a temporary operating parameter that allows mobile device 202 to gain access to the 2G network during the activation mode or during a separate 2G activation procedure. The Digital PCS system allows for both IMSIs and MINs, while the GSM network only supports IMSIs.

A GSM security key (Ki) 410 uniquely identifies SIM 204 to the 3G network, and an ANSI security key (A-key) 412 uniquely identifies SIM 204 to the 2G network. In the preferred embodiment, Ki 410 and A-key 412 are "permanently" loaded into SIM 204 and, as such, are not overwritten, replaced, or superseded at any time. Alternate embodiments of the present invention may allow the reprogramming of such keys.

A default intelligent roaming database (IRDB) 414 identifies coverage areas that are deemed to be favored or preferred and/or those that are deemed otherwise. During over-the-air programming, the IRDB may be re-programmed into a mobile device to provide updated roaming information. For example, default IRDB 414 may favor those geographic areas where the particular system operator has a presence, but in time a new program may be downloaded to overwrite the existing IRDB to provide better service. A system operator code (SOC) 416, which identifies the system operator, and an international charge card identifier (ICC ID) 418, which uniquely identifies the particular SIM, are preferably pre-loaded in a "permanent" state.

An actual SIM may include any number of pre-loaded parameters, and those shown in FIG. 4 are not intended to limit the scope of the present invention in any way. A given SIM may utilize alternative or additional parameters depending upon the particular application.

Figure 5:
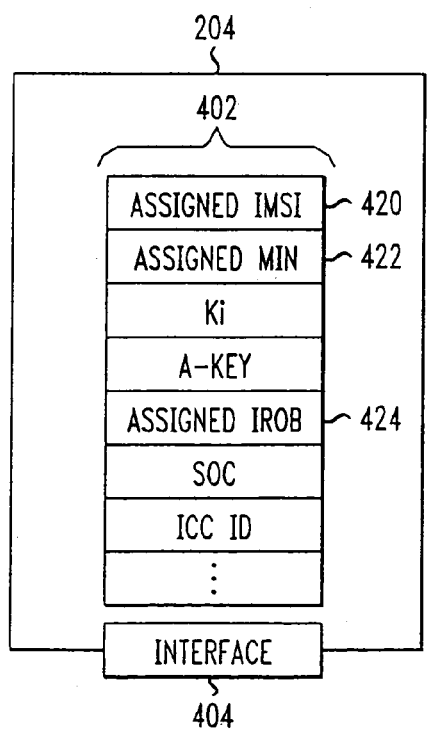
FIG. 5 is a schematic representation of a SIM having a number of assigned operating parameters stored therein.

In accordance with the remote programming techniques of the present invention, at least one of the temporary operating parameters stored in the SIM will be superseded upon activation. FIG. 5 depicts SIM 204 in a programmed or activated state. The programmed state may be responsive to a number of procedures performed during the activation mode. As described above, SIM 204 (and memory element 402 in particular) is configured to store at least one assigned operating parameter in response to an activation process. In a practical embodiment, the temporary operating parameters are replaced by or overwritten with a number of assigned operating parameters. The assigned operating parameters may be designated as "permanent" parameters or, in an alternate embodiment, they may be reprogrammable.

As shown in FIG. 5, an assigned International Mobile Subscriber Identity (IMSI) 420, an assigned MIN 422 and an assigned IRDB 424 have been programmed into SIM 204. The other pre-loaded parameters have not been changed. In contrast to conventional GSM systems, SIM 204 need not be pre-loaded with permanent IMSIs. Rather, the system operator can reserve a block of temporary IMSIs that merely facilitate activation, which allows permanent IMSIs to be efficiently allocated on an as-needed basis. Once activation is complete for a given SIM, the temporary IMSI can be reused.

FIG. 6a is a flow chart of an activation process 600 that may be performed in mobile communication environment 200. It should be appreciated that portions of process 600 may be carried out by mobile device 202, SGSN 206, GGSN 208, IBAS 212, service provider site 221, or SIM 204. In addition, a practical system may perform additional or alternative steps during process 600, which may be performed in conjunction with a more complex suite of activation procedures. Process 600 assumes that SIM 204 has been installed into mobile device 202 and that mobile device 202 has been powered up. The activation techniques described herein may be equivalently applied in the situation where mobile device 202 is communicating with the network via a kiosk, a cable connection, a conventional modem, etc.

In accordance with a practical wireless implementation, mobile device 202 receives a signal that indicates that the network supports 3G communications. This control signal may be transmitted by the legacy 2G network, e.g., by an MSC. At this point, mobile device 202 may begin process 600, during which 3G data transmission techniques are employed.

Initially, mobile device 202 transmits an attach request to SGSN 206 using the temporary IMSI for access (task 602). The mobile device 202 and/or SGSN 206 may bypass the normal authentication scheme by recognizing the temporary IMSI (task 604). The SGSN 206 will access the GHLR 210 that specifically supports the mobile station as an unprogrammed mobile device 202. Next, the location of mobile device 202 is updated with GHLR 210 (task 606). The location updating may be associated with communications between SGSN 206, which has received the initial contact from mobile device 202, and GHLR 210. SGSN 206 may suitably inform GHLR 210 that mobile device 202 requires activation. In accordance with the preferred embodiment, GHLR 210 may assume that any mobile device that requires activation has contacted SGSN 206 in a coverage area maintained by the particular service provider or system operator.

GHLR 210 responds to the SGSN with subscription data about the mobile device 202. In connection with the location update procedure, GHLR 210 provides an activation profile to mobile device 202 via SGSN 206 (task 608). Alternatively, any suitable operating node in environment 200 (such as IBAS 212) can be configured to provide the activation profile to SGSN 206. In the context of standard 3G terminology, the activation profile is transferred in an "Insert Subscriber Data" message. The activation profile contains operating parameters, identifying data, or restrictions associated with the activation procedure. For example, the activation profile preferably includes an IP address associated with an activation center for the system operator and quality of service parameters. In addition, the activation profile may include restrictions that allow mobile device 202 to establish only one packet data channel (i.e., the PDP context related to the activation procedure).

As described above, portions of the attach procedure may be carried out between SGSN 206 and GHLR 210. However, alternate embodiments of the present invention may communicate the activation profile between SGSN 206 and other system support nodes, e.g., IBAS 212. Consequently, portions of the attach procedure may also occur between SGSN 206 and IBAS 212.

Eventually, mobile device 202 will be attached or registered to the 3G network (task 610). Thereafter, a packet data transmission link is established between mobile device 202 and a network support node such as IBAS 212 (procedure 612—described in connection with FIG. 7). The establishment of the packet data link may be initiated by SIM 204, by mobile device 202, or by the network itself in response to the recognition of the temporary IMSI.

As described above, the packet data transmission link is preferably an IP link and data packets may be routed from SGSN 206, to any number of GGSNs, and to IBAS 212. In the context of 3G terminology, procedure 612 establishes a packet data protocol (PDP) context between mobile device 202 and the wireless network and in the context of the GGSN, which sets up an Internet Protocol (IP) address for the mobile device 202 and in IP "presence" within the network. The GGSN communicates the mobile device's IP address to the SGSN, which in turn activates the mobile station. Upon activation, the mobile device 202 is connected with the application server or carrier, and may proceed with further activation functions. While the PDP context is intact, an activation context is created (task 614) to enable remote activation of the user's subscription and to remotely program the assigned operating parameters into SIM 204. In connection with task 614, mobile device 202 may be automatically directed (using the IP address included in the activation profile) to the system provider site 221. Automatic access to the activation site ensures that the subscriber properly enables services and acquires permanent SIM parameters before attempting to access any other services on the network.

System provider site 221 may provide a menu of service features to the remote user via IP link 228 and GGSN 208. These services may include options to select service features, service plans, operational parameters, contractual terms or the like. From the Internet site, promotions, advertisements or operational instructions and the like may also be provided. In addition, site 221 may initiate action at IBAS 212 via IP link 230. For example, site 221 may respond to user selections and cause IBAS 212 to program SIM 204 via GGSN 208 and SGSN 206.

The remote user may be prompted to enter service enrollment information during the activation process (procedure 616—described in connection with FIG. 8). The present invention may carry out the service enrollment procedure via a wireless IP link or a land line IP link (e.g., through a conventional modem connection or from a support kiosk) from mobile device 202. Once the user has completed selecting his service plan and features, the network creates and assigns permanent parameters to replace the temporary parameters that have been pre-loaded into SIM 204. The assigned operating parameters are communicated to SIM 204 over the IP data link and in accordance with the packet data protocol (task 618).

After the relevant SIM data has been transferred, mobile device 202 may transmit a detach request to SGSN 206 (task 620). The detach request, which is associated with the temporary IMSI, functions to purge the temporary IMSI from the network. Thereafter, the activation context is deleted (task 622) and the IP links can be torn down between IBAS 212, GGSN 208, and SGSN 206. The detachment of mobile device 202 is completed when the activation context is deleted, the PDP context is deleted, and the mobile device 202 is no longer communicating with the network (task 624).

SIM 204 preferably stores the assigned operating parameters in one or more suitable memory fields (task 626). In addition, a number of network nodes, e.g., billing system 216, may be updated to reflect the assigned parameters. Task 626 may be performed at any time once the assigned operating parameters have been received by mobile device 202. As described above, the assigned operating parameters may be stored in new memory fields or the temporary parameters may be overwritten with the assigned parameters.

After becoming detached from the network, mobile device 202 may generate a reattach request using the assigned or permanent IMSI to establish a normal communication session with the network (task 628). Task 628 may be automatically performed in response to a soft resetting of mobile device 202 following the detachment procedure. Thus, mobile device 202 may be activated and reattached to the 3G network in a relatively seamless manner without any additional feedback from the user.

Although the activation procedure described above is carried out by a 3G network, 2G activation parameters may also be communicated in a concurrent manner. In other words, the 3G transmission techniques may be used to perform 2G activation. Thus, mobile device 202 can be programmed with a MIN for use in a 2G mode during the activation procedure.

Figure 6B:
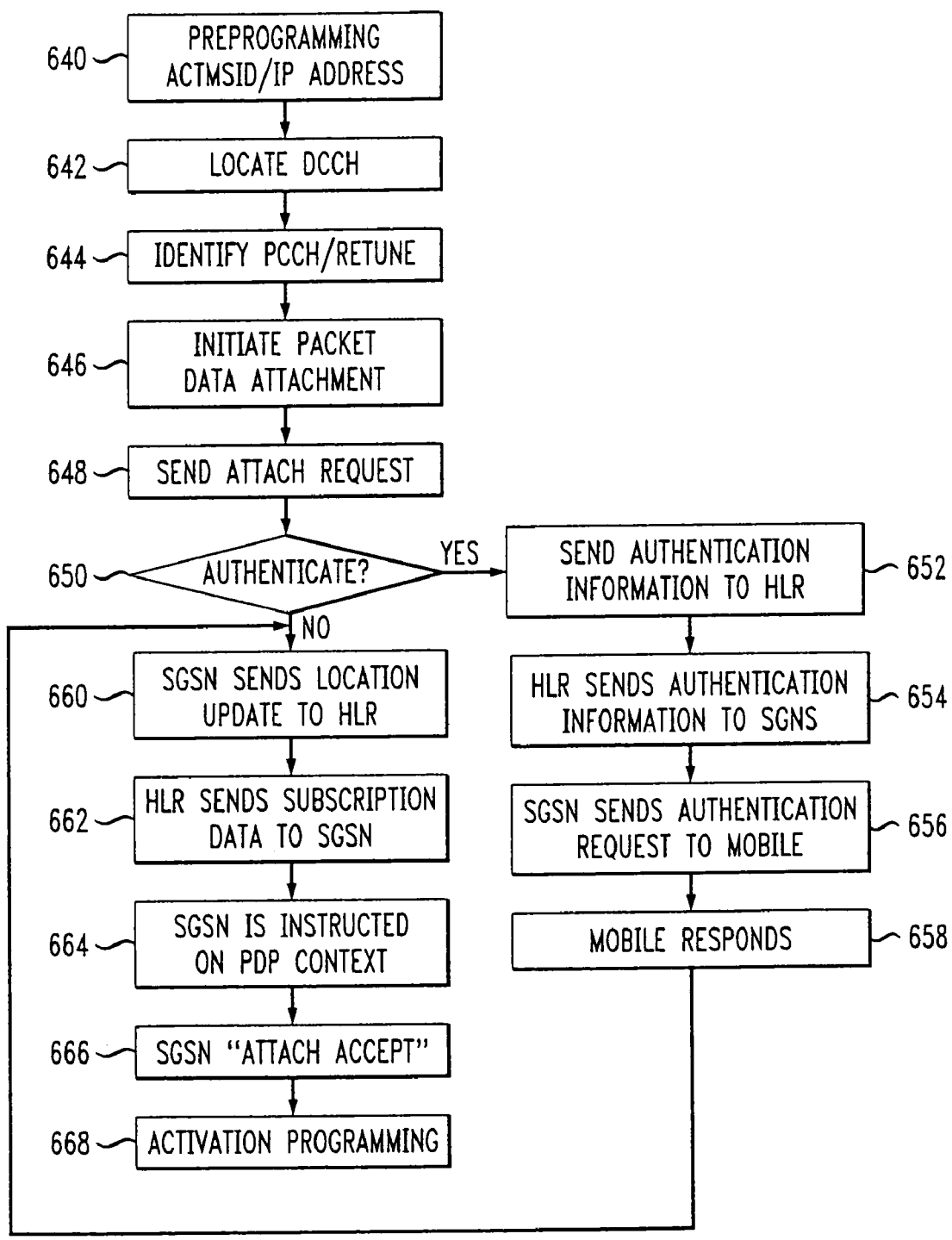
FIG. 6b illustrates a further embodiment of the preparation for the activation process.

FIG. 6b illustrates another embodiment of the invention in a Digital PCS network context. First, an unprogrammed GPRS capable mobile station is pre-programmed with an Activation Mobile Station Identifier (ActMSID) in the SIM (task 640). In addition, an IP address for the operator's activation center/server is also programmed with other information necessary to establish a specification Packet Data Protocol (PDP) context for activation. The ActMSID for packet services is an IMSI to allow the mobile station to attach to the GPRS packet network. The IMSI format is based on the ITU recommendations and is 15 digits in length. The IMSI is composed of a three-digit Mobile Country Code and a three-digit Mobile Network Code. These are defined for the carrier which will supply service to the mobile station. A nine-digit mobile station identification number (MSID) is also included. These remaining nine digits are defined to (1) indicate that the identifier is an IMSI for an unprogrammed mobile station, and (2) to provide randomness so that the MSID is unique to identify the mobile station.

Next, upon a mobile device 202 powering up, the mobile station 202 locates an acceptable data control channel (DCCH) (task 642). The DCCH is composed of a number of logical channels in the forward direction (from the base station to the mobile station) and one logical channel in the reverse direction (from the mobile station to the base station). Then, the mobile device 202 identifies an associated packet control channel (PCCH) and retunes to it (task 644). This channel may be a packet control channel conforming to the EGPRS-136 standard and supported by the acceptable operator. Once the mobile station is tuned to the PCCH, it initiates packet data attachment procedures (task 646).

First, the packet attachment procedures involve sending an "Attach Request" signal to the serving GPRS support node over the packet channel (task 648). This "Attach Request" includes the IMSI for the mobile station, which is the ActMSID.

Once the attach request is received by the SGSN, the SGSN may choose to initiate an authentication function or it may bypass authentication (task 650). If the SGSN chooses to authenticate, then the SGSN sends a "Send Authentication Info" request to the GHLR supporting the mobile station (task 652). Since the mobile station is unprogrammed, the GHLR will be one that supports unprogrammed mobile stations. The GHLR identifies the unprogrammed mobile station by the information sent by the SGSN (i.e., the ActMSID or other information) and sends a signal back to the SGSN with the authentication information (task 654). The SGSN then sends an Authentication Request Signal to the mobile station (task 656), which responds with the appropriate authentication response (task 658).

Once authentication is achieved, or was bypassed, the SGSN sends a Location Update signal to the GHLR supporting the unprogrammed mobile station (task 660). This signal informs the GHLR of the locations where the mobile is currently residing. The GHLR sends subscription data back to the SGSN informing the SGSN that this is an unprogrammed mobile station, and that no services other than "activation" are allowed (task 662). The SGSN is thus instructed that the mobile station is only allowed to activate a PDP context for activations or for maintenance (task 664). Now, the mobile station is considered attached to the packet network and the SGSN transmits an "Attach Accept" signal to the mobile station over the packet channel (task 666).

As previously mentioned, the attach function need not involve the GHLR. Thus, an alternate embodiment may utilize IBAS 212, or any suitable system support node, to perform the attach procedures with the SGSN.

While in the attached mode, activation programming can proceed (task 668). FIG. 6c illustrates in more detail the activation procedures. In a practical embodiment, the system establishes or activates a PDP context in the Gateway GPRS Support Node (GGSN) to allow the activation programming to proceed. A PDP context establishes an "IP" address and a point of presence for the mobile station in the IP domain. The recently attached mobile station initiates a special PDP context for activation by sending an Activate PDP Context request signal to the SGSN (task 670). This special request may be a special PDP Type and, for example, a special Access Point Name for the activation network. The SGSN sends a Create PDP Context Request to the GGSN (task 672). The GGSN creates a new entry in its PDP context table, assigns an IP address, and returns a response signal back to the SGSN including the IP address (task 674). The SGSN sends a response signal to the mobile station indicating that the context is active. Included in this signal is the IP address that is dynamically assigned at the GGSN (task 676).

Once in the active context, the mobile station activation application is initiated (task 678). This brings up an IP-based application that the subscriber may use to begin the application process. This may be in the form of a menu with options to choose from and may be provided via the mobile station or other communication means, such as a computer accessing the Internet via a land-line. The application connects with the IP address of the carrier's activation server, using the pre-programmed IP address in the mobile station's SIM (task 680). The IP address dynamically assigned to the mobile station's maintenance context is provided to the activation sever to allow the application server to send data to the mobile station via the IP address of the context (task 682).

Once the mobile station is connected to the application server, application functions may proceed (task 684). For example, the authentication functions may include credit authorization, downloading SIM information such as the MIN, a directory number, IRDB, etc. This information is passed over the IP network between the mobile station and the activation server. Once the application level is complete of the activation process, the application level connection is terminated (task 686).

Once activation is complete, the mobile station deactivates from the activation context (task 688). It does this using the old ActMSID. The deactivation process "tears" down the context and releases the IP address. The mobile station also detaches the ActMSID from the network by sending a detach signal to the SGSN (task 690), which clears the mobility information from the SGSN and GHLR. Once detached, the mobile station resets and commits the downloaded information to memory. It uses this information to erase knowledge of the ActMSID (task 692). Step 692 further includes initiating system selection procedures via intelligent roaming, and registers/attaches to the preferred system using the permanent MSID.

Figure 7:
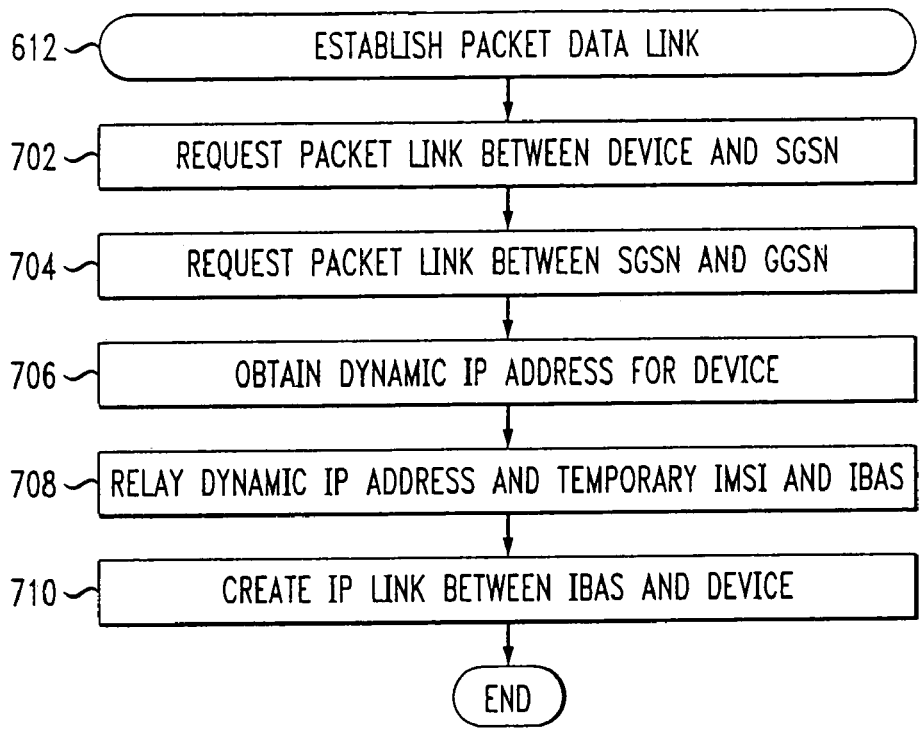
FIG. 7 is a flowchart illustrating a process for establishing a packet data link in a mobile communications environment.

FIG. 7 is a flow diagram that illustrates one exemplary procedure 612 for establishing a packet data transmission link between mobile device 202 and a network support node. As described in connection with activation process 600, mobile device 202 preferably establishes an IP link with IBAS 212 (via SGSN 206, GGSN 208, and/or service provider site 221) to facilitate remote activation.

The IP link is initiated when mobile device 202 transmits a suitable request to SGSN 206 (task 702). In a practical system, task 702 may cause mobile device 202 to generate an "Activate PDP Context" message, which is transmitted as a packet control channel (PCCH) message. This request may provide a temporary operating parameter, e.g., the temporary access IMSI, to SGSN 206. In response to this request, SGSN 206 transmits a suitable request to GGSN 208 (task 704). In practice, task 704 may cause SGSN 206 to generate a "Create PDP Context" for transmission as an IP message. The request from SGSN 206 may provide a temporary operating parameter, e.g., the temporary access IMSI, to GGSN 208. The network support nodes may exchange appropriate acknowledgement messages at any time to establish an IP link between such nodes.

In the currently preferred embodiment, an IP address is obtained for mobile device 202 (task 706) using a suitable technique such as the dynamic host configuration protocol (DHCP). The DHCP dynamically assigns IP addresses to client nodes in response to the client nodes logging onto the network. The DHCP software can be implemented in GGSN 208, SGSN 206, and/or in other network nodes. The assigned IP address may be relayed to SGSN 206, GGSN 208, and to any number of intervening nodes, routers, switches, or the like.

The dynamically assigned IP address is also relayed to IBAS 212 to enable IBAS 212 to effectively communicate with mobile device 202 via the IP link (task 708). In addition, the temporary access IMSI may be relayed to IBAS 212. At this time, a suitable IP link is created between IBAS 212 and mobile device 202 (task 710); the IP link may be routed between GGSN 208, SGSN 206, or any number of additional network support nodes. Thereafter, IBAS 212 and mobile device 202 can transmit data (in a reciprocal manner) over the IP link in accordance with a packet data protocol.

As described briefly above, the user of mobile device 202 may be allowed to select or modify service features, options, and preferences during the activation process. Consequently, the user need not be limited to service "packages" offered by the telecommunication service provider, but may customize the service through a menu-based interface provided at mobile device 202. In this respect, service operation can be better tailored to a user's needs. The IP link enables the system operator or the service provider to efficiently and effectively communicate information directly to the remote user without having to rely on technicians or sales personnel. In addition, the packet data transmission technique enables a large amount of data to be transmitted in a substantially seamless manner (in contrast to short message service techniques that are limited to the transmission of distinct 160 byte messages).

As used herein, "user preference information" refers to information provided by a user that controls the operation of at least an aspect of a communication service to which the user is or will be enrolled. Such user preference information may be initially provided or updated by the user without intervention by the system operator or service provider personnel. Examples of user preference information are provided below.

EXAMPLE 1

International Calling

Conventionally, international calls are not permitted from mobile devices, due to the high incidence of fraud. With the inventive techniques, a user may establish a list of countries for which international calls are permitted, and for which the user agrees to pay the costs. Advantageously, the user has more flexibility in the service, while fraud is deterred since the fraudulent user is unlikely to know the permitted countries for a user.

EXAMPLE 2

Roaming

Conventionally, service providers support roaming throughout the United States. With the inventive techniques, a user may establish a list of areas for which roaming is permitted or prohibited. In addition, service providers can offer different billing packages for different geographical areas.

EXAMPLE 3

Billing Plans

Most conventional mobile service billing plans are based on total calling volume, time of day, and day of the week. Newer billing plans enable a user to establish a list of calling numbers, but setting up and maintaining the list requires intervention by service provider personnel. With the inventive techniques, yet more flexibility in billing plans can be provided.

EXAMPLE 4

Telephone Number Selection

Conventionally, a user's telephone number is established when the user enrolls in a mobile service plan; the user is not able to change the assigned number. With the inventive techniques, a user can review available telephone numbers and modify the assigned number to any available number.

EXAMPLE 5

Billing Data

Conventionally, users are not provided with billing information in real time. With the inventive techniques, a user can specify that he or she desires provision of real time billing information, and can also vary the method of provision. For example, if the user has a telecommunication device with a display, the display can show estimated cost updated every predetermined time period, such as every minute. Alternatively or additionally, the user can specify that the system provide an audio indication of cost, for example, an announcement audible only to the user at every ten dollars of cost which will be billed to the user. Further, the announcements can be limited to calls at certain times of the day or to/from a specified area. As another alternative, the communication network can provide a cost estimate for an incoming call, e.g., $2.00/minute.

Figure 8:
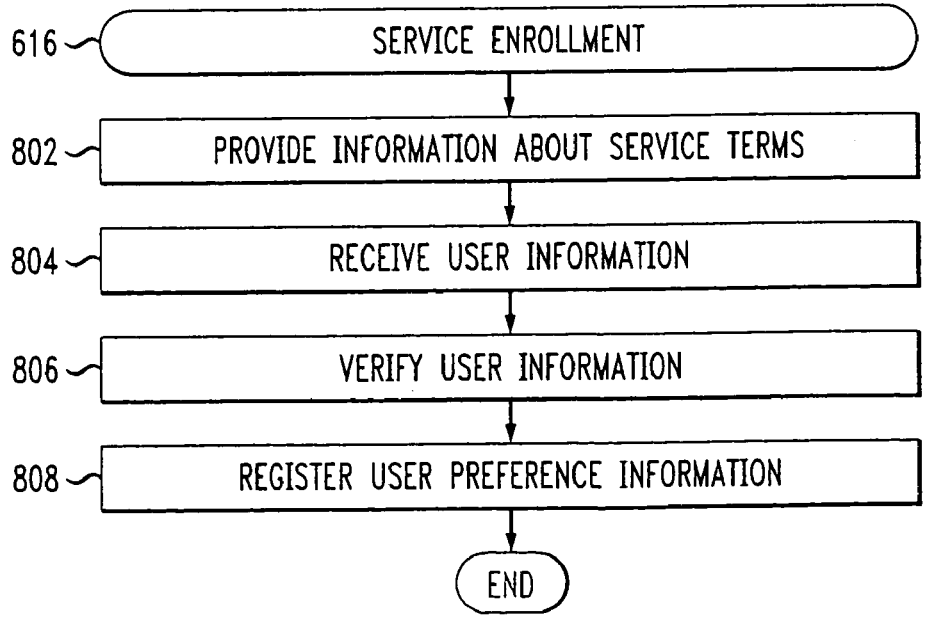
FIG. 8 is a flowchart illustrating a service enrollment process.

An exemplary service enrollment process 616 (see FIG. 6) is depicted as a flow diagram in FIG. 8. Enrollment process 616 can be accomplished in a wholly automated fashion, by interacting with service provider personnel via a telephone call or an online session, or by consulting an appropriate online web page. In the preferred embodiment, enrollment process 616 is performed in a remote and wireless (over-the-air) manner via mobile device 202 itself.

Initially, information regarding available service terms is provided to the user (task 802). Such information is preferably transmitted to mobile device 202 via the previously established IP link. In a practical embodiment, the information is associated with the service provider site 221 maintained by the system operator or the service provider. In an alternate embodiment, the user may be interacting with land-line equipment located at a point of sale office or at the user's home. As described above, the IP address of this Internet site 221 can be transmitted to mobile device 202 in the activation profile. The Internet site 221 may provide the user with menu options to enable or select service features, service plans, operational parameters, contractual terms, or the like. The Internet site 221 may also provide additional content regarding the details of the services, promotions, use of devices, etc.

After making the appropriate selections, the user will provide user preference information to the service provider.

In the preferred embodiment, the user enters his choices at an interface of mobile device 202 (e.g., keypad 314 or display 312). The information, or other data indicative of a number of service features selected by the user, is transmitted over the IP link. Eventually, SGSN 206 receives this information (task 804) for processing in an appropriate manner. For example, the user information may be verified by the system operator or the service provider using any number of methodologies, e.g., by checking it against previously stored data maintained in a database or by checking the credit of the user (task 806). In addition, the system registers the user preference information (task 808) by making appropriate entries in database 220 (see FIG. 2).

In accordance with another aspect of the present invention, an enrolled and activated user of mobile device 202 can modify one or more service features using an over-the-air technique. FIG. 9 is a flow chart of a service modification process 900 that may be performed to modify the service features associated with a user of mobile device 202. Process 900 may be prompted by the user or by the system operator. Initially, a suitable communication link is established for mobile device 202 (task 902). In a practical embodiment, a wireless IP link can be established between mobile device 202 and an appropriate network support node such as SGSN 206. Alternatively, the communication link may employ conventional digital data transmission techniques, cellular techniques, or land-line connection techniques. Thereafter, information regarding new or available service terms or features is provided to the user (task 904). The user can browse such terms and features and decide whether to modify his existing service. As described above in connection with task 802, the preferred embodiment utilizes the IP link to communicate such information directly to mobile device 202.

In accordance with a preferred aspect of the present invention, the system operator or service provider is capable of providing existing service terms to individual users of the network. Consequently, an appropriate network support node, e.g., SGSN 206, is configured to determine the location of mobile device 202 to facilitate the transmission of the existing service terms or other personalized data (task 906). In a practical system, SGSN 206 interrogates GHLR 210 to obtain the current location or status of any number of devices that are operating within a specific coverage area.

GGSN 208 may retrieve a number of currently enrolled service features for the given user by interrogating the service provider database 220. In a practical embodiment, GGSN 208 may access database 220 via service provider site 221. Once the existing features are identified, SGSN 206 can provide information indicative of such existing features to mobile device 202 (task 908). The IP link and a suitable data protocol are preferably used to convey such information to mobile device 202. The user may then review the currently enrolled features, new or available features, promotions, and the like, before deciding whether to modify any service terms.

If the user desires to modify an existing service term or add to his existing suite of features, then a suitable request may be communicated to the system operator (task 910). For example, Internet site 221 maintained by the service provider may provide instructions (via mobile device 202) to enable the user to carry out the modification process in a remote manner. In response to such instructions, the user may engage keypad 314 or display 312 (see FIG. 3) to transmit a modification request to SGSN 206. The modification request is preferably transmitted over the IP link and in accordance with a data protocol. Thereafter, the modified user information is received (task 912), verified (task 914), and registered or updated (task 916) as described above in connection with service enrollment process 616. Notably, conventional cellular networks, such as a 2G network, are not capable of efficiently handling downstream control communications (i.e., a confirmation message from a network support node to mobile device 202), and short messaging would introduce undesirable delay to the modification process. At the completion of service modification process 900, any number of additional network support nodes may be updated to reflect the new service terms.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

We claim:

1. A programmable module for use with a mobile communication device capable of receiving data in accordance with a data transmission protocol, said programmable module comprising:
    a memory element for storing at least one temporary operating parameter that facilitates operation of said mobile communication device in an activation mode; and
    an interface configured to receive at least one assigned operating parameter during said activation mode, wherein said mobile communication device receives said at least one assigned operating parameter over a data transmission link and in accordance with said data transmission protocol,
    said at least one temporary operating parameter comprises a temporary International Mobile Subscriber Identity (IMSI); and
    said at least one assigned operating parameter comprises a permanent IMSI.

2. A programmable module according to claim 1, wherein said memory element is further configured to store said at least one assigned operating parameter.

3. A programmable module according to claim 1, wherein said memory element is further configured to overwrite said at least one temporary operating parameter with said at least one assigned operating parameter.

4. A programmable module according to claim 1, wherein:
    said mobile communication device is compatible with General Packet Radio Service (GPRS); and
    said programmable module is configured as a Subscriber Identity Module (SIM).

5. A programmable module according to claim 1, wherein said mobile communication device receives said at least one assigned operating parameter over a wireless packet data transmission link.

6. A mobile communication device capable of receiving data over a data transmission link in accordance with a data transmission protocol, said mobile communication device comprising:
    a receiver configured to receive, via said data communication link and in accordance with said data transmission protocol, at least one assigned operating parameter; and
    a memory element electronically coupled to said receiver, said memory element being configured to store said at least one assigned operating parameter, wherein said memory element initially contains at least one temporary operating parameter that facilitates operation of said mobile communication device in an activation mode, said receiver is compatible with General Packet Radio Service (GPRS); said at least one temporary operating parameter comprises a temporary International Mobile Subscriber Identity (IMSI); and said at least one assigned operating parameter comprises a permanent International Mobile Subscriber Identity (IMSI).

7. A mobile communication device according to claim 6, further comprising a transmitter configured to transmit, via said data communication link and in accordance with said data transmission protocol, an attach request using said at least one temporary operating parameter.

8. A method for activating a mobile communication device capable of receiving data in accordance with a packet data protocol, said method comprising the steps of:

providing a programmable module that is compatible with said mobile communication device, said programmable module storing at least one temporary operating parameter to facilitate operation of said mobile communication device in an activation mode;

establishing a packet data transmission link between said mobile communication device and a network support node during said activation mode;

transmitting, via said packet data transmission link, at least one assigned operating parameter to said mobile communication device;

storing said at least one assigned operating parameter at said programmable module;

detaching said mobile communication device from said network support node; and generating, from said mobile communication device, a reattach request using said at least one assigned operating parameter.

9. A method according to claim 8, wherein said storing step replaces said at least one temporary operating parameter with said at least one assigned operating parameter.

10. A method according to claim 8, further comprising the step of transmitting, from said mobile communication device, an attach request using said at least one temporary operating parameter.

11. A method according to claim 8, wherein said establishing step establishes a wireless packet data transmission link.

12. A method according to claim 8, further comprising the step of receiving via said packet data communication link, information indicative of a number of service features selected by a user of said mobile communication device.

13. The method of claim 8 further comprising:

transmitting, via said packet data transmission link, information related to a number of current service features for a user, said transmitting step being performed by said network support node;

said network support node receiving, from said user, a request to modify a current service feature associated with said user; and updating a service provider associated with said network support node in response to said request to thereby implement the modification of said current service feature.

14. A method according to claim 13, wherein:

said mobile communication device is capable of receiving data in accordance with a packet data protocol;

said communication link established during said establishing step is a wireless packet data transmission link; and said receiving step receives said request over said wireless packet data transmission link and in accordance with said packet data protocol.

15. A method according to claim 14, wherein:

said mobile communication device is compatible with General Packet Radio Service (GPRS); and said establishing step establishes a wireless Internet Protocol (IP) data transmission link.

16. A method according to claim 13, further comprising the steps of:

retrieving said number of current service features for said user from said service provider database; and determining the location of said mobile communication device to facilitate said transmitting step.

17. A method for activating an unprogrammed mobile station from a service node in a radio packet communication network, the method comprising:

storing an activation identifier in a memory that is accessible by the service node, wherein the activation identifier includes identity information about the unprogrammed mobile station;

connecting the unprogrammed mobile station to the service node via a data control channel;

transferring the unprogrammed mobile station from the data control channel to a corresponding packet channel, in which packet control and data signals are communicated between the service node and the mobile station; thereafter accessing the memory to identify the mobile station according to the activation identifier;

communicating activation signals to the mobile station via the packet channel; and thereafter programming the mobile station for receiving packet data from an applications server.

18. The method of claim 17 further comprising:

providing a user information regarding present services;

providing the user a menu of possible services;

receiving service modification choices from the user; and modifying user services according to the service modification choices.

19. A method of providing automated modification of service options for a wireless device in a wireless network according to claim 18, wherein providing a user information regarding present services further comprises providing the user information via the wireless device after establishing a communication link between the wireless device and the wireless network.

20. A method of providing automated modification of service options for a wireless device in a wireless network according to claim 19, wherein providing the user a menu of possible services further comprises providing the menu via the wireless device and wherein receiving service modification choices further comprises receiving the service modification choices via the wireless device.

21. A method of activating a wireless device in a wireless network comprising:

attaching the wireless device to the wireless network;

establishing a packet data protocol (PDP) context for the wireless device attached to the wireless network;

providing activation options to the wireless device while the wireless device is in the PDP context, wherein the activation options include at least one of features, service plans, and contractual terms;

preprogramming a subscriber identity module (SIM) of the wireless device with a temporary mobile station identification and internet protocol (IP) address of an activation server coupled to the wireless network; and sending an attach request signal from the wireless device, the attach request signal including the temporary mobile station identification to a serving general packet radio service support node (SGSN) over a packet control channel of the wireless network.

22. The method of claim 21, wherein providing the activation options comprises:

providing an electronic option menu to a user of the wireless device;

transmitting user service option selections to the wireless network; and providing selected service options to the wireless device in response to the user service option selections.

23. A method of providing user-selectable service options for a wireless device according to claim 22, further comprising establishing a wireless link between the wireless device and the wireless network.

24. A method of providing user-selectable service options for a wireless device according to claim 23, wherein providing an electronic option menu further comprises providing an electronic option menu on the wireless device after establishing the wireless link.

25. A method of providing user-selectable service options for a wireless device according to claim 24, wherein the electronic option menu further comprises promotional information.

26. A method of providing user-selectable service options for a wireless device according to claim 22, wherein providing an electronic option menu further comprises providing an electronic option menu via a communication device other than the wireless device.

27. A method of providing user-selectable service options for a wireless device according to claim 22, further comprising:

verifying user information in the wireless network; and registering the user service option selections in a database.

28. A method of activating a wireless device in a wireless network according to claim 21, wherein attaching the wireless device to the wireless network further comprises:

sending a location update signal to a home location register (HLR) supporting the wireless device when unprogrammed; and sending subscription data from the HLR to the SGSN, the subscription data informing the SGSN that the wireless device is unprogrammed and that no services other than activation are allowed in a packet data protocol context.

29. A method of activating a wireless device in a wireless network according to claim 28, wherein attaching the wireless device to the wireless network further comprises sending an attach accept signal from the SGSN to the wireless device.

30. A method of activating a wireless device in a wireless network according to claim 29, wherein establishing a PDP context for the wireless device attached to the wireless network further comprises:

initiating a special PDP context for activation request to the SGSN; and transmitting a create PDP context request from the SGSN to a gateway general packet radio service support note (GGSN).

31. A method of activating a wireless device in a wireless network according to claim 30, wherein establishing a PDP context for the wireless device attached to the wireless network, further comprises:

creating a new entry in a PDP context table;

assigning a dynamic IP address for the wireless device;

returning a response to the SGSN including the dynamic IP address; and sending a response signal, from the SGSN to the wireless device, indicting an active context for activation, including the dynamic IP address.

32. A method of activating a wireless device in a wireless network according to claim 31, wherein the step providing activation options further comprises:

connecting the wireless device to the IP address of the activation server using the IP address preprogrammed in the wireless device's SIM; and providing the dynamic IP address of the wireless device to the activation server.

33. A method of activating a wireless device in a wireless network according to claim 32, wherein the step of providing activation options further comprises:

transmitting data from the activation server to the mobile device using the dynamic IP address; and providing activation functions to the mobile station for user service choices.

34. A method of activating a wireless device in a wireless network according to claim 33, wherein the step of providing activation options further comprises downloading SIM information to the mobile device, including a permanent mobile station identification.

35. A method of activating a wireless device in a wireless network according to claim 34, further comprising, after completion of activation:

deactivating the activation context;

releasing the activation context IP address; and detaching the temporary mobile station identification from the network by sending a detach signal to the SGSN to clear the mobility information from the SGSN and the HLR.

36. A method of activating a wireless device in a wireless network according to claim 35, further comprising, after activation:

resetting the mobile device;

storing a permanent mobile station identification in the mobile station;

initiating system selecting using intelligent roaming; and registering with the preferred system using the permanent mobile station identification.

* * * * *

UNITED STATES PATENT AND TRADEMARK OFFICE
CERTIFICATE OF CORRECTION

PATENT NO. : 7,266,371 B1
APPLICATION NO. : 09/707671
DATED : September 4, 2007
INVENTOR(S) : Umesh J. Amin et al.

It is certified that error appears in the above-identified patent and that said Letters Patent is hereby corrected as shown below:

Col. 22

Claim 33, line 28, please replace " to the mobile" with --to the wireless--

Claim 33, line 30, please replace "mobile station" with --wireless device--

Claim 34, line 35, please replace "mobile device" with --wireless device--

Claim 36, line 49, please replace "mobile device;" with --wireless device;--

Claim 36, line 51, please replace "mobile station" with --wireless device--

Signed and Sealed this

Twenty-fifth Day of December, 2007

JON W. DUDAS
*Director of the United States Patent and Trademark Office*